Figure 1:
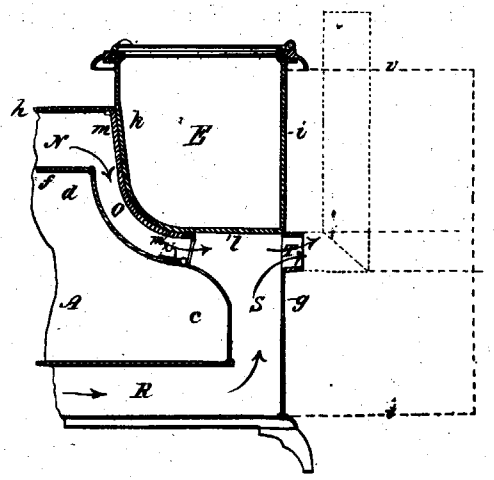
Figure 3:
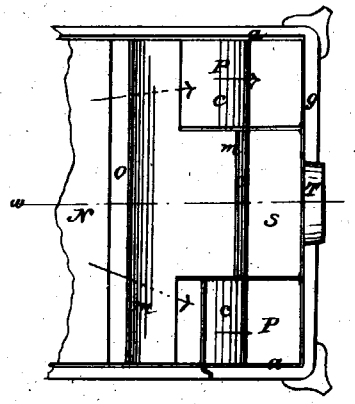

Sheet 1, 3 Sheets.
F. Ritchie.
Reservoir Cooking Stove.
No. 4,061. Reissued Jul. 5, 1870.
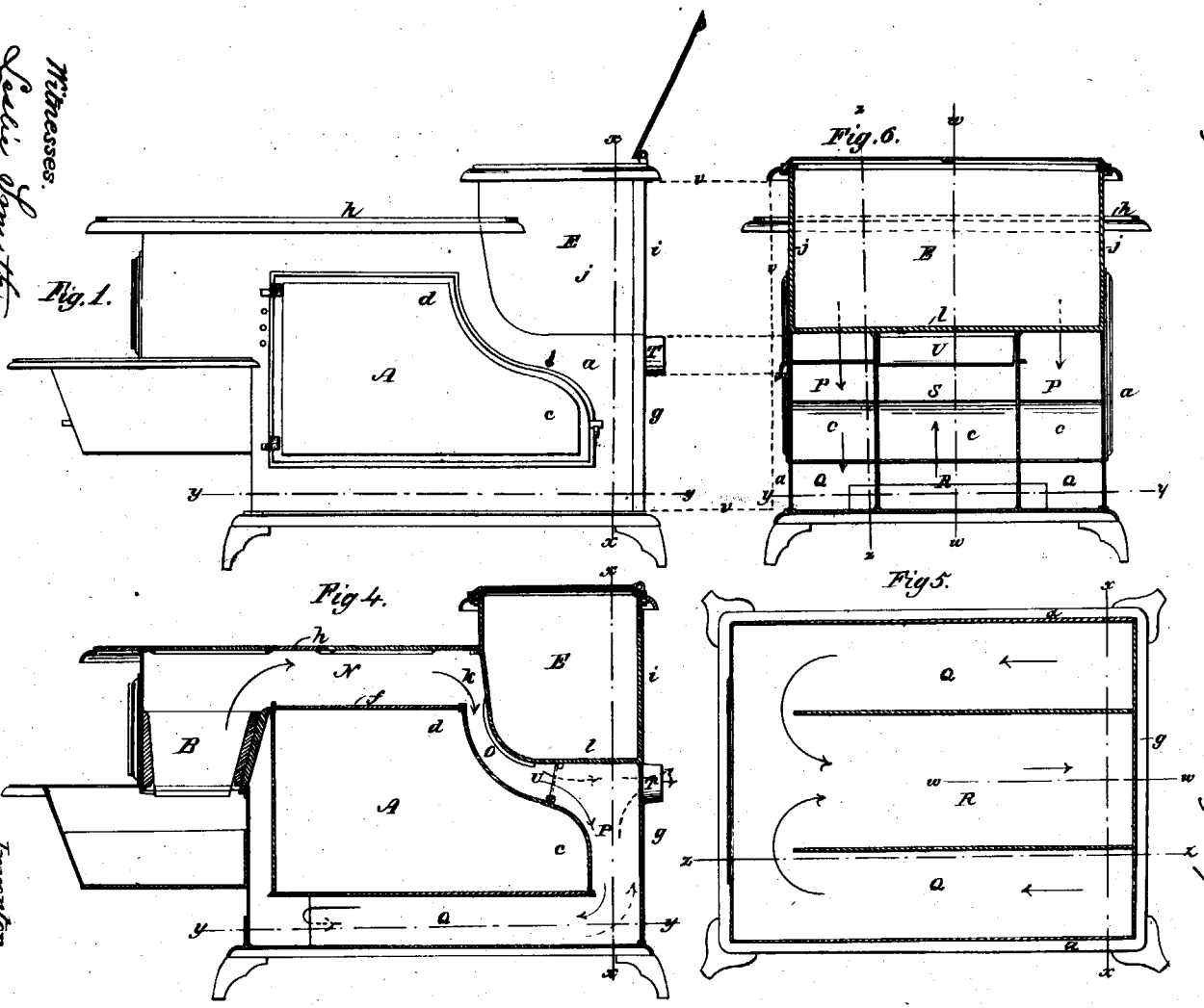
Witnesses.
Leslie Smyth
Austin L. Park.
Inventor:
Francis Ritchie.

Sheet 2, 3 Sheets.
F. Ritchie.
Reservoir Cooking Stove.
No. 4,061. Reissued Jul. 5, 1870.
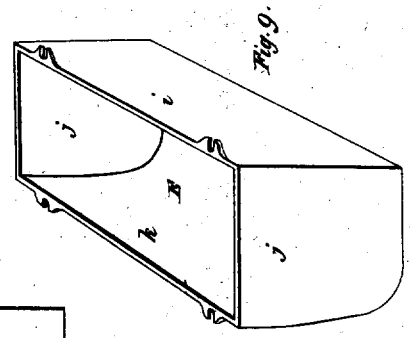
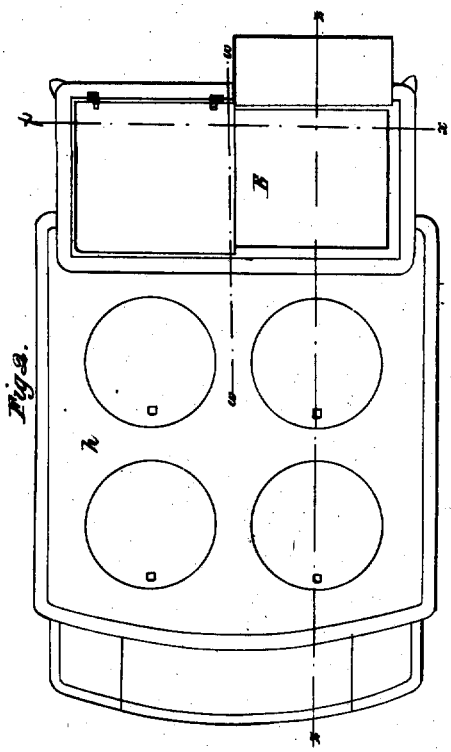
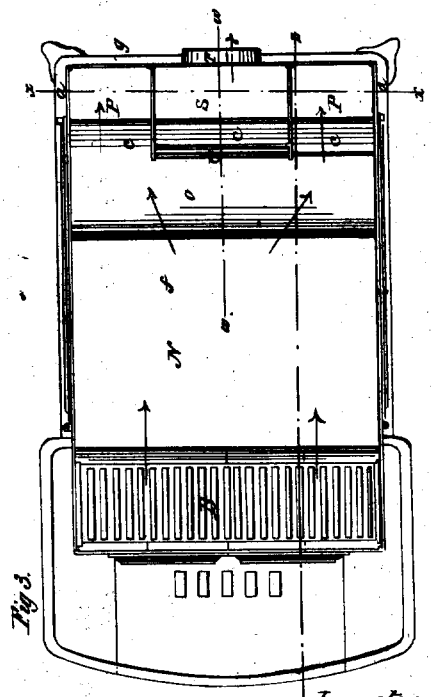
Witnesses.
Leslie Smyth
Austin F. Park.
Inventor:
Francis Ritchie.

Sheet 3, 3 Sheets.

F. Ritchie.

Reservoir Cooking Stove.

No. 4,061. Reissued Jul. 5, 1870.

Witnesses
Leslie Smyth
Austin H. Park.

Inventor:
Francis Ritchie.

United States Patent Office.

SHERMAN S. JEWETT, OF BUFFALO, NEW YORK, (ASSIGNEE OF FRANCIS RITCHIE,) ASSIGNOR TO JEWETT AND ROOT.

*Letters Patent No.* 91,968, *dated June* 29, 1869; *antedated June* 15, 1869; *reissue No.* 4,061, *dated July* 5, 1870.

COOKING-STOVE.

The Schedule referred to in these Letters Patent and making part of the same.

FRANCIS RITCHIE, of the city of Troy, in the county of Rensselaer and State of New York, assignor to SHERMAN S. JEWETT, of the city of Buffalo, in the county of Erie, in the said State of New York, did invent certain Improvements in Cooking-Stoves, of which the following is a specification.

His invention consists—

First, in constructing the baking oven of cooking-stoves, so that the lower part of the rear portion of the oven, or that furthest from the fire-chamber, shall extend backward beyond the upper portion, whereby the radiating top and bottom plates of such rear extension are brought closer together, to compensate in a measure for the greater distance of this rear portion from the fire-chamber.

Second, in the combination and arrangement of a water-reservoir over such rearwardly-extended lower portion of the oven.

Third, in arranging a water-reservoir, supported over the rearwardly extended lower portion of the oven, so that the rear plate of the reservoir will be even with or in substantially the same plane as the outer vertical rear plate of the stove.

Fourth, in the arrangement with the rearwardly-extended lower portion of the baking oven, and a water-reservoir supported thereon of the boiler, diving and up-cast flues, a damper and exit-passage, in such a manner that the boiler-flue, of the full width of the stove, shall extend downward under the reservoir, where the diving-flues commence, while the damper is placed at the termination of the rear of this extension of the boiler-flue, so as to permit, when open, the direct passage of the products of combustion under the reservoir to the vent or exit-passage, arranged to open rearward through the back-plate of the stove, and under the reservoir, all as hereinafter shown and described.

In the accompanying drawing—

Figure I is a side elevation;

Figure II is a plan;

Figure III is a plan with the water-reservoir and top plate removed;

Figure IV is a vertical section in line *s s* in Figs. II, III, V, and VI;

Figure V is a horizontal section in line *y y* in Figs. I, IV, and VI; and

Figure VI, vertical section in line *x x* in Figs. I, II, III, IV, and V; all of one of the said RITCHIE's improved stoves.

Figure VII is a vertical section of a modified part of the same stove, in line *w w* in Figs. II, III, V, VI, and VIII;

Figure VIII is a plan of the same part with the water-reservoir and top plate removed; and Figure IX is a perspective view of the reservoir without its cover.

Like letters of reference designate like parts in each of the figures, and the arrows therein indicate the direction in which the gases of combustion pass through the stove.

A is the baking-oven;

B, the fire-chamber at one end;

C, the lower part of the opposite rear portion of the oven extended rearward beyond the upper part thereof; and E, the water-reservoir, arranged on this lower extension C, as shown, with its base below the level of the top cooking-plate *h* of the stove, and of such a width as not to project backward beyond the rear upright plate *g* of the lower portion of the stove at the back of the lower part of the oven, which extends under the reservoir, so as to permit of the arrangement at the rear of the stove covering the whole end thereof of a warming-closet of equal width and capacity from top to bottom.

The rear side *i* and the ends *j* of the reservoir, or either of them, may be covered by a heating or warming-flue space or casing, or left naked, as shown in the drawing.

The front side, *k*, or bottom, *l*, or both front and bottom of the reservoir, may be exposed directly to the hot gases of combustion, in the stove, as indicated in Figs. IV and VI, or be protected or separated therefrom, either wholly or partially, by an intervening plate or plates, *m m*, as shown in Fig. VII.

The sheet or boiler-flue N, leading from the fire-chamber, is extended of the full width of the stove downward between the reservoir E and the upper rear part of the oven, as shown at O, where it terminates at the point indicated by the damper U.

The products of combustion arrested by this damper divide and enter the side or diving-flues P P, which extend downward at the rear of the lower and extended portion C of the oven, and open into the ordinary side flues Q Q, which extend forward under the oven.

R is the middle or return-flue, and

S, the up-cast flue, or continuation thereof, which passes upward at the rear end of the extension C to the bottom of the reservoir, where it terminates in the exit-passage T, formed through the rear plate of the stove under the bottom of the reservoir.

The flue S being separated from the extension O of the boiler-flue by simply the damper U, the opening of the latter, as shown in Fig. VII, permits the products of combustion to pass directly from the flue O under the reservoir into the exit-passage T.

When the damper is closed, as in Figs. III, IV, and VI, the hot gases divide and pass through the flues P P, Q Q, R, and S, to the exit-passage, as hereinbefore described. In either case, whether the draught is direct or under the oven, the arrangement of the parts is such as to insure the requisite temperature for properly heating the reservoir.

The arrangement of the water-reservoir, with its rear side flush with the back upright plate *g*, enables a warming-closet of uniform width and size, from top to bottom, to be attached to the rear of the stove, and receive heat directly from both the rear side *i* of the hot-water reservoir and the outer plate *g* in the rear end of the stove below the reservoir, as indicated by dotted lines at *v v v*, in Fig. VII.

Constructing the oven with the rear extension C brings the radiating surfaces of the top and bottom of the latter nearer each other, so as to insure a temperature therein equal to that of the forward portions, which are nearer the fire-chamber, and consequently subjected to a higher degree of heat.

What is claimed as the invention of the said RITCHIE is—

1. Constructing and arranging the baking-oven of a cooking-stove, so that the lower part of the rear portion of the baking-oven, or that furthest from the fire-chamber, shall extend backward beyond the upper portion, substantially as and for the purpose hereinbefore set forth.

2. The combination and arrangement of a water-reservoir over the backwardly-extended lower portion of a baking-oven, substantially as hereinbefore set forth.

3. The arrangement of a water-reservoir, supported over the rearwardly-extended lower portion of a baking-oven, so that the rear plate of the reservoir will be flush with or in substantially the same plane as the outer vertical rear plate of the stove, substantially as hereinbefore set forth.

4. The arrangement, with the rearward extension C and water-reservoir E, of the extension boiler-flue O, diving-flues P P, up-cast flue S, damper U, and exit-passage T, all substantially as hereinbefore shown and described.

SHERMAN S. JEWETT.

Witnesses:
EDWARD WILHELM,
O. S. GARRETSON.